United States Patent
Laing et al.

(10) Patent No.: US 12,385,381 B2
(45) Date of Patent: Aug. 12, 2025

(54) CONTROL SYSTEM FOR AUTOMATING DRILLING OPERATIONS

(71) Applicant: Halliburton Energy Services, Inc., Houston, TX (US)

(72) Inventors: Moray Lamond Laing, Spring, TX (US); Mahdi Parak, Katy, TX (US); Nazaad Baksh, Conroe, TX (US); Andreas G. Sadlier, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1093 days.

(21) Appl. No.: 17/349,660

(22) Filed: Jun. 16, 2021

(65) Prior Publication Data

US 2022/0186598 A1 Jun. 16, 2022

Related U.S. Application Data

(63) Continuation-in-part of application No. 17/123,200, filed on Dec. 16, 2020, now Pat. No. 12,229,138.

(51) Int. Cl.
*E21B 44/00* (2006.01)
*G05B 13/04* (2006.01)
(Continued)

(52) U.S. Cl.
CPC ............ *E21B 44/00* (2013.01); *G05B 13/041* (2013.01); *G05B 13/048* (2013.01);
(Continued)

(58) Field of Classification Search
CPC .. G06F 16/2455; G06F 16/2462; G06F 16/35; G06F 16/954; G06F 18/15;
(Continued)

(56) References Cited

U.S. PATENT DOCUMENTS 8,121,971 B2  2/2012 Edwards et al.
2004/0182574 A1  9/2004 Adnan et al.
(Continued)

FOREIGN PATENT DOCUMENTS

KR  10-2015-0118340 A  10/2015
WO  2019-178240 A1  9/2019

OTHER PUBLICATIONS

International Search Report and Written Opinion date mailed Sep. 10, 2021; International PCT Application No. PCT/US2020/065937.
(Continued)

*Primary Examiner* — Diedra McQuitery
(74) *Attorney, Agent, or Firm* — DeLizio, Peacock, Lewin & Guerra, LLP

(57) ABSTRACT

A method of generating, at an IIOT device mounted to equipment of a drilling system, a relay variable, a measurement variable, or a control variable and a message having an IP address. Classifying, by application services of a cloud service provider, the relay variable, the measurement variable, or the control variable; identifying a category or a category and sub-category from a plurality of categories and sub-categories based on variable; cataloguing the relay variable, the measurement variable, or the control variable based on the category or the category and the sub-category; selecting from a library of catalogued relay variables, measurement variables, and control variables, at least one selected from a group comprising a parameter and a value; and identifying a pattern using a statistics based algorithm, the statistics based algorithm using a standard operating procedure, the parameter and the value, the pattern indicating a deviation in the standard operating procedure.

20 Claims, 6 Drawing Sheets

(51) Int. Cl.
  *G06F 16/2455* (2019.01)
  *G06F 16/35* (2019.01)
  *G06F 18/28* (2023.01)
  *G06N 5/047* (2023.01)
  *G06F 16/2458* (2019.01)
  *G06F 16/954* (2019.01)
  *G06F 17/18* (2006.01)
  *G06F 18/15* (2023.01)
  *G06F 18/2321* (2023.01)

(52) U.S. Cl.
  CPC .......... *G06F 16/2455* (2019.01); *G06F 16/35* (2019.01); *G06F 18/28* (2023.01); *G06N 5/047* (2013.01); *G06F 16/2462* (2019.01); *G06F 16/954* (2019.01); *G06F 17/18* (2013.01); *G06F 18/15* (2023.01); *G06F 18/2321* (2023.01)

(58) Field of Classification Search
  CPC ...... G06F 18/2321; G06F 18/28; G06F 17/18; E21B 44/00; G06N 5/047; G05B 13/041; G05B 13/048
  See application file for complete search history.

(56) References Cited

U.S. PATENT DOCUMENTS

| | | |
|---|---|---|
| 2009/0132458 A1 | 5/2009 | Edwards et al. |
| 2012/0123756 A1 | 5/2012 | Wang et al. |
| 2013/0314241 A1* | 11/2013 | Jamison .................. E21B 44/00 340/853.1 |
| 2014/0067353 A1 | 3/2014 | Shelley et al. |
| 2014/0351183 A1 | 11/2014 | Germain et al. |
| 2014/0353033 A1 | 12/2014 | Pink et al. |
| 2015/0148919 A1 | 5/2015 | Watson |
| 2015/0369014 A1 | 12/2015 | Weatherhead et al. |
| 2016/0053604 A1 | 2/2016 | Abbassian et al. |
| 2017/0268323 A1* | 9/2017 | Dykstra .................. E21B 47/07 |
| 2017/0343974 A1* | 11/2017 | Baskaran ........... G05B 19/0423 |
| 2018/0114381 A1* | 4/2018 | Hiemer ..................... E02F 9/26 |
| 2020/0157922 A1 | 5/2020 | Stout et al. |

OTHER PUBLICATIONS

International Search Report and Written Opinion date mailed Oct. 6, 2021; International PCT Application No. PCT/US2021/039823.

* cited by examiner

CONTROL SYSTEM FOR AUTOMATING DRILLING OPERATIONS

BACKGROUND

As the oil and gas drilling industry move away from manual onsite management and control of well site operations to automated management and control of well site operations, research and development efforts of statistics based and Artificial Intelligence (AI) based management and control solutions used to accurately manage and control well site operations are increasing as demand for these solutions increases. Advantages of automating well site operations include safer operating conditions, a reduction or elimination of human error, cost reduction, and enhanced control and management of operations. Regarding the latter point, with increasing levels of automation, an onsite driller, e.g., can be less concerned with managing operation of drilling equipment and more concerned with managing the construction process and quality of a wellbore.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
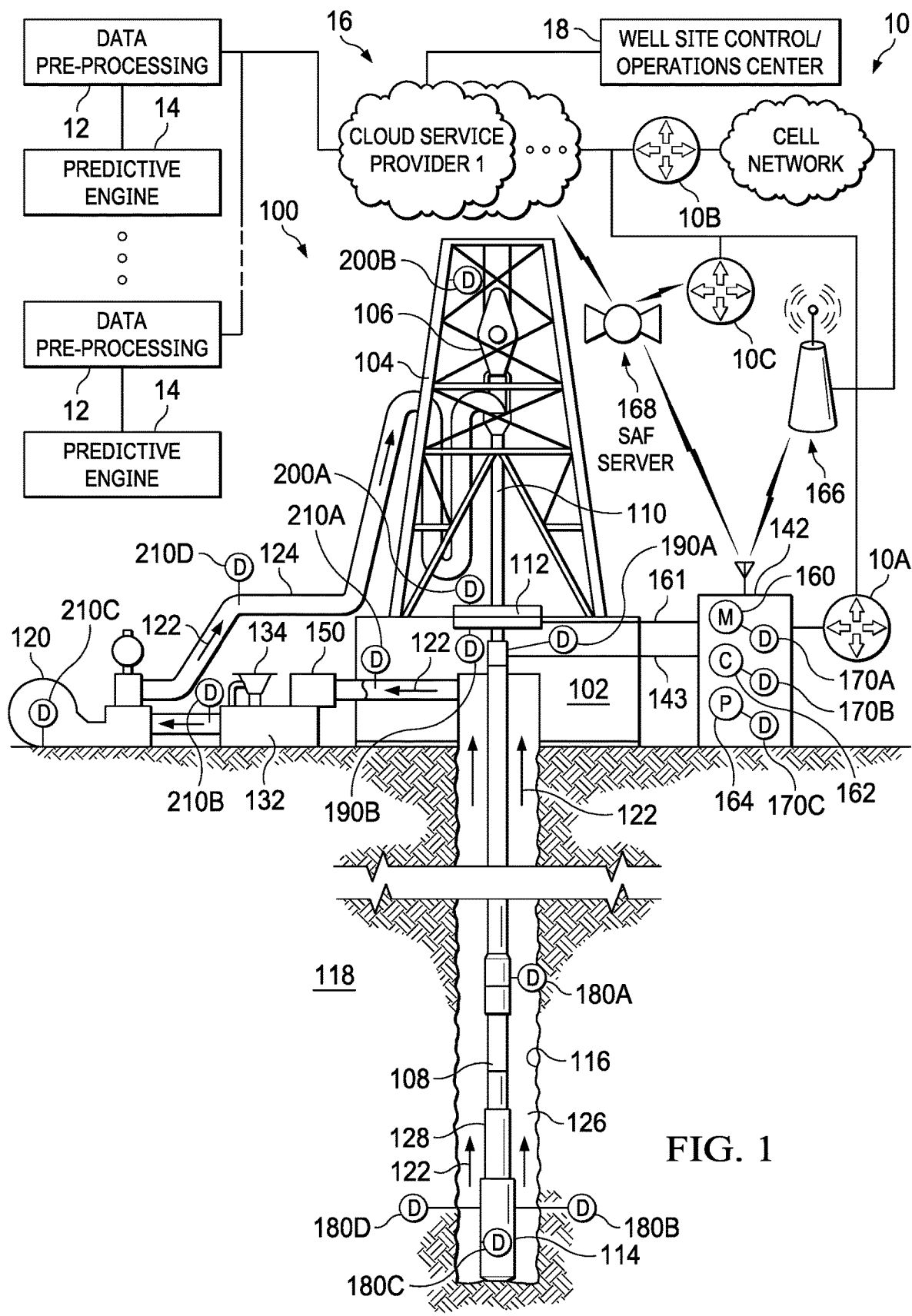
FIG. 1 is an illustration of a diagram of a drilling system used to form a wellbore in a subterranean formation coupled with a control system used to automate operations of the drilling system, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

As previously stated, statistics based and AI based automated solutions that can be used to manage and control well site operations are increasing in demand as the oil and gas industry moves away from expensive and dangerous manual management and control of well site operations. However, a significant issue and, therefore, a major hindrance in automating these types of operations is the lack of a standardized library that can be used by statistics based or AI based algorithmic models to determine how to control well site operations equipment based on well site operation data variables. The number of data variables required in order to accurately manage and control well site operations can be exceedingly large. The number of data variables needed, e.g., to determine how to manage and control a drilling operation can be hundreds of thousands if not millions of data variables. Another significant issue, therefore, relates to how to efficiently process the data variables in order to determine how to manage and control well site operations without effecting accuracy.

Presented herein is a system and an apparatus comprising a plurality of devices, a library module, and an analysis module. Each device having a processor and each device is mounted to equipment of a drilling system. Each device includes a processor configured to generate a relay variable, a measurement variable, a control variable, or any combination thereof. The processor of the device also configured to generate a message having a device address, a network address, or both. The library module is configured by a processor to classify the relay variable, the measurement variable, or the control variable based on a parameter, a value, or both. The library module is also configured by a processor to identify a category or a category and sub-category from a plurality of categories and sub-categories based on the parameter, the value, or both. The library module is also configured by a processor to catalogue the relay variable, the measurement variable, or the control variable based on the category or the category and the sub-category. The analysis module is configured by a processor to select from a library of catalogued relay variables, measurement variables, control variables, and a parameter, a value, or both. The pattern recognition module configured by a processor to identify at least one pattern using a statistics based algorithm. The statistics based algorithm uses a standard operating procedure, classified procedures and recommendations, at least one semantic category, and the parameter, the value, or both. The at least one pattern indicating a deviation in the standard operating procedure.

In an embodiment, the system includes equipment used to control a process of drilling a wellbore into a subterranean formation. In another embodiment, the system includes a predictive engine configured by a processor to generate predictive results used to control at least one piece of equipment.

In yet still another embodiment, the relay variable comprises a parameter indicating the relay variable is a date variable and a value having a time. The measurement variable comprises a parameter indicating that the measurement variable is an equipment variable that identifies equipment, a measurement type, or both, and a value is a measure. The control variable comprises a parameter indicating the control variable is an equipment variable that identifies equipment and a value having a control value. In still another embodiment, the relay variable comprises an additional variable having a parameter indicating the variable as a location variable and a value indicating a location and equipment of the drilling system.

In another embodiment, the system and apparatus further comprises at least one gateway configured to communicate the relay variable, the measurement variable, the control variable, or any combination thereof over at least one selected from a group comprising the Internet, an intranet, a data network, a satellite network, and a cellular network to at least one selected from a group comprising a cloud service provider, a load balancing node, and an application processing node.

In another embodiment, the system and apparatus further comprises a cloud service provider, the cloud service provider comprises one or more middleware layer based load balancers, data pre-processing modules, and one or more predictive engines. The one or more middleware layer based load balancers is communicable coupled with the data pre-processing modules and the predictive engines. Each data pre-processing module is communicable coupled with a predictive engine. The library module, the analysis module, and the pattern recognition module are parts of each data pre-processing module.

Also presented herein is a method comprising: generating, at a device mounted to equipment of a drilling system, at least one selected from a group comprising a relay variable, a measurement variable, and a control variable; generating, at the device mounted to equipment of the drilling system, a message having a device address, a network address, or both; classifying the relay variable, the measurement variable, or the control variable based on a parameter, a value, or both; identifying a category or a category and sub-category from a plurality of categories and sub-categories based on the parameter, the value, or both; cataloguing the relay variable, the measurement variable, or the control variable based on the category or the category and the sub-category; selecting from a library of catalogued relay variables, measurement variables, and control variables, at least one selected from a group comprising a parameter and a value; and identifying at least one pattern using a statistics based algorithm, the statistics based algorithm using a standard operating procedure, classified procedures and recommendations, at least one semantic category, and the at least one selected from the group comprising the parameter and the value, the at least one pattern indicating a deviation in the standard operating procedure.

In an embodiment, the relay variable comprise a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value.

In another embodiment, the relay variable comprises an additional variable having a parameter indicating the variable as a location variable and a value indicating a location and equipment of the drilling system. In another embodiment, the method comprises communicating the relay variable, the measurement variable, the control variable, or any combination thereof over the Internet, an intranet, a data network, a satellite network, a cellular network, or any combination thereof to at least one selected from a group comprising a cloud service provider, a load balancing node, and an application processing node. In yet another embodiment, the method further comprises load balancing processes and tasks of a plurality of data pre-processing modules and a plurality of predictive engines. The library module, the analysis module, and the pattern recognition module are parts of each data pre-processing module.

FIG. 1 is a diagram of a drilling system 100 used to form a wellbore in a subterranean formation coupled with a control system 10 used to automate operations of the drilling system 100, in accordance with example embodiments. Although the drilling system 100 of FIG. 1 is illustrated as a land-based system, the teachings of the present disclosure may be applied to offshore platforms, drill ships, semi-submersibles, and drilling barges (not expressly shown). Furthermore, the drilling system 100 creates a wellbore 116 that in FIG. 1 is illustrated as being vertical but the drilling system 100 may create horizontal, multilateral, or directional wellbores. Control system 10 comprises one or more cloud service providers 16 providing application services, such as various types of data preprocessing modules 12 and predictive engines 14. The data preprocessing modules 12 and predictive engines 14 are used to generate predictive results that can be used to control well site operations, such as a drilling operation. In some embodiments, the predictive results generated can be provided to a well site control/operations center 18 where in conjunction with Subject Matter Experts (SME), as an example, various types of well site operations can be managed. The one or more cloud service providers can use a clustered computing environment that in combination with load balancing techniques generates control variables that can be used to control equipment operation in an efficient and accurate manner.

The drilling system 100 is fitted with Industrial Internet of Things (IIOT) devices. An IIOT device can be an IIOT relay, an IIOT sensor, and an IIOT sensor and controller. The IIOT devices can be configured with registration information for a cloud service provider and an application service provider, one or more IP addresses, an access network identifier, a cloud service provider identifier, an application service identifier, a well site identifier, a well site operation identifier, monitored equipment identifier, an indicator designating whether monitored equipment requires real-time control, an IIOT device identifier, an IIOT device type, a PKI encryption key pair, or any combination thereof. In addition, a system map of an IIOT devices used at a well site operation can include the same information and, therefore, not all IIOT devices may need to configured with all information.

The IIOT devices can be configured to generate measurement variables and control variables and communicate the measurement variables to a cloud service provider and the control variables to monitored equipment. Depending on an application an IIOT device is communicating with, not all identifiers may be needed as some may be redundant or can otherwise be determined based on another identifier or identifiers. Additionally, some of the IP addresses and identifiers may be a product of the registration process.

The one or more IP addresses can include a source address of the IIOT device and destination IP addresses for one or more access service providers, one or more cloud service providers, one or more other IOT devices, a registration server, and one or more destination IP addresses for a load balancing node, or nodes, and an application processing node, or nodes. The registration server, the load balancing node, and an application processing node and applications executing thereon can be identified by a combination of IP address and application identifier, such as a cloud service provider identifier or an application service identifier. The IIOT devices can be configured to register with a cloud service provider and an application service through one or more gateways 10A, 10B, 10C that are connected with a registration server. The IIOT devices can be configured to communicate with either the registration server, a load balancing node, or nodes, or the application processing node depending on the type of application service.

In some implementations, not all IIOT devices may need to register with a registration service but rather one IIOT device or a controller can be configured to register all IIOT devices fitted to the drilling system 100. This can be useful in a situation where static IP addresses are used. This can also be useful in a situation where an IIOT system map that lays out a well site's IIOT device configuration is known, based on a-priori information. Regardless of the implementation, a precise IIOT system map that lays out a well site's IIOT device configuration can be useful when generating predictive results using instance communications data based on a current layout of IIOT devices and existing known layouts of IIOT device that have associated therewith relevant a-priori information.

IIOT sensors can monitor downhole conditions and equipment operations, e.g. sensing wellbore environment conditions, such as pressure, temperature, and chemical properties. IIOT controllers, IIOT relays, or a combination thereof can be used to determine a location of a section of a drill string 108, and a location of the drill bit 114. The IIOT sensors and IIOT controllers can be used to determine a rate of revolution of the drill bit 114, determine an angle of orientation of the drill bit 114. In some implementations, the IIOT controllers can be configured with a value range that relates to a range of operation for equipment used in the drilling process. The value range can be used by the IIOT controller as a trigger to automatically adjust a rate of revolution of the drill bit 114 or the angle of orientation of the drill bit 114 if the rate of revolution or the angle of orientation exceeds a threshold. The IIOT controller can be configured to generate measurement variables and report the measurement variables if the value range is compromised. The IIOT sensors, controllers, and relays can generate measurement variables and communicate with a load balancing node and an application executing thereon.

In addition, IIOT sensors and controllers performing measurements and controlling operation of the drill string 114 can communicate directly with a load balancing node and an application executing thereon. Directly, in this context, means the IIOT device is an active device, as opposed to a passive device that simply modulates measurements onto a power line, configured with information necessary for dynamic and direct communications with an end point. In some situations, real-time control of equipment of the drilling system 100 is necessary in order to prevent damage to a wellbore, equipment, and, possibly, personnel. However, in the case where real-time control is not necessary, the IIOT device can communicate directly with an application service. Stated differently, in some cases where real-time control is not necessary, an IIOT device or devices can communicate with a processing node and an application executing thereon without using a load balancing node. The IIOT devices can be configured with static IP addresses, configured with dynamic IP addresses, or a combination thereof. The IP addresses can be IPv4, IPv6 type addresses, or a combination thereof.

In some implementations, one or more IIOT devices can be configured to communicate with a particular cloud service provider over an access network, not illustrated for the sake of brevity, such as a data network, the Internet, and an intranet through gateway 10A. In other implementations, one or more IIOT devices can be configured to communicate with a particular cloud service provider over a cellular access network 166 through gateway 10B. In yet other implementations, one or more IIOT devices can be configured to communicate with a particular cloud service provider over satellite services access network 168 through gateway 10C. It should be understood that the gateways 10A, 10B, 10C are access points to the cloud service providers but can also provide additional services, such as address translations services, encryption services, e.g. using the PKI infrastructure, and firewall protection services. It should be understood that the drilling system 100 can be fitted with hundreds, possibly thousands of IIOT devices. It should also be understood, depending on the number of IIOT devices, thousand, hundreds of thousand, and possible more columns of data variables can be generated during a well site operation for each well site, drilling or otherwise, being monitored.

Additionally, the IIOT devices can receive commands from an application service, identifiable by an application service identifier, of a cloud service provider, identifiable by a cloud service provider identifier, through gateways 10A, 10B, 10C, or any combination thereof. The IIOT devices can also be configured to send responses back to an appropriate application service of the cloud service provider, identifiable by an application service identifier and cloud service provider identifier. The commands can include a command to: perform a diagnostic's test; reset an IIOT device or reconfigure settings of an IIOT device; alter settings of a monitored IIOT device, such as manipulating control values used to open and close a valve and manipulate control values used to set the rate of revolution of pump or motor; change direction of drill bit 114 or pump, change orientation of drill bit 114 or a pump, or any combination thereof.

In some embodiments, the network that forms the IIOT devices and the cloud service provider may be a private network that uses traditional firewall protection procedures to restrict access to any application service vis all edge nodes, such as routers and gateways. An advantage of using such a configuration is that encryption and decryption mechanisms, such as that used in the PKI infrastructure, may not be required and, therefore, the network configuration is less complex and processing and communication of variables are less resource intensive.

As previously mentioned, a cloud service provider can use a clustered computing environment and load balancers to enhance processing and communications efficiency. A cloud service provider can include a plurality of application processing nodes and load balancing nodes. Each processing node can be configured with one or more executable partitions, such as containers or virtualized systems. The virtual systems can be hardware based virtualization, software based virtualization, or a combination of both. The load balancing nodes can be a kernel based, i.e. a device based or, again stated differently, a middleware component, load balancing solution, such as a Robot Operating System (ROS) based load balancing node used to schedule and distribute responses and requests between application processes based on an application processing node's workload (processes and tasks).

The IIOT devices of the drilling system 100 can be communicable coupled with one or more load balancing nodes, application processing nodes, or both using an appropriate load balancing node identifier, an application processing node identifier, or both of a cloud service provider of control system 10 through gateway 10A, gateway 10B, gateway 10C, or any combination thereof. The load balancing nodes schedule application processes and their respective tasks to be executed by application processing nodes according to process loads of the application processing nodes. In addition, the load balancing nodes coordinates communications between processes and their respective task in order to complete one or more services offered by the application processing nodes. The service offered, as an example, can be data preprocessing services from data preprocessing modules 12 and predictive engine services from predictive engines 14.

An advantage of using IIOT devices is to eliminate "bottle necks" in the communication of data by eliminating central processing points, such as that found in traditional Programmable Logic Controller (PLC) systems. The use of IIOT devices along with the clustered computing environment and load balancing techniques improves equipment and site operation efficiencies and accuracies by reducing latency in computing and communications. Additionally, automating the drilling system 100 also reduces development expenses and improves safety.

Drilling system 100 includes a drilling platform 102 that supports a derrick 104 with a traveling block 106 for raising and lowering a drill string 108. Drilling system 100 also includes a pump 120, which circulates drilling fluid 122 through a feed pipe 124 to a kelly drive 110, which in turn conveys the drilling fluid 122 downhole through interior channels of the drill string 108 and through one or more orifices in a drill bit 114. Drilling fluid 122 is then circulated back to the surface through an annulus 126 formed between the drill string 108 and the sidewalls of the wellbore 116.

The drill bit 114 is attached to the distal end of the drill string 108. A rotary table 112 is coupled to the drill string 108 and rotates the drill bit 114 at a set rate. The rate is controlled by a motor 160 coupled to the rotary table 112 through a chain 161. In some implementations, the drill string 108 includes a Bottom Hole Assembly (BHA) 128 coupled to the drill bit 114. The BHA 128 can include a motor for driving the drill bit 114 at a set rate. The BHA 128, in this implementation, can also control the angular orientation of the drill bit 114. In this particular implementation, the rotary table 112 may not be needed. In some implementations, completion of a horizontal section of a wellbore 116 can require the use of downhole motors, pumps, or both used to pump drilling fluid 122 into the lateral section of the wellbore 116 and to drive the drill string 108 and drill bit 114.

The drilling fluid 122 has a number of main objectives, including cooling and lubricating the drill bit 114, removing the cuttings from the drill bit 114 and the wellbore 116, and coating the walls of the wellbore 116 with a mud type cake. Drilling fluid 122 is typically circulated through drilling system 100 at a flow rate sufficient to remove fractured rock from the vicinity of drill bit 114 in sufficient quantities within a sufficient time to allow the drilling operation to proceed downhole at least at a set rate. As the drill bit 114 repeatedly fractures rock and drilling fluid 122 moves the fractured rock uphole, wellbore 116, which penetrates various subterranean rock formations 118, is created.

Due to the production of fines during a drilling operation, a flow rate of the drilling fluid 122 and the rate of revolution of the drill bit 114 can be maintained at an adequate pressure in order to prevent debris from effecting operation of the drill bit 114. As such, the flow rate of the drilling fluid 122 and the rate of revolution of the drill bit 114 can be measured and operational control of the flow rate and rate of revolution controlled. In addition, drilling fluid 122 may be under sufficient pressure at a location in wellbore 116, particularly a location near a hydrocarbon, gas, water, or other deposit, to prevent a blowout. Additionally, if drilling system 100 experiences vaporization bubbles in drilling fluid 122 near drill bit 114, the vaporization bubbles may have deleterious effects. Drilling fluids 122 may be circulated at a flow rate also sufficient to remove vaporization bubbles from the vicinity of drill bit 114. Maintaining the right pressure balance can be critical.

At the surface, recirculated or spent drilling fluid 122 exits annulus 126. Recirculated or spent drilling fluid 122 may simply be directed back into drill string 108 or may otherwise be processed using only some of the equipment shown in FIG. 1. However, in drilling system 100, drilling fluid 122 is conveyed to one or more fluid processing units 150 via an interconnecting flow line 130. After passing through fluid processing units 150, cleaned drilling fluid 122 is deposited into retention pit 132. Although fluid processing unit 150 is illustrated in FIG. 1 near the outlet of the wellbore 116, fluid processing unit 150 may be located at a distance from the outlet of wellbore 116. Drilling system 100 may further include mixing hopper 134 communicably coupled to or otherwise in fluidic communication with retention pit 132. Mixing hopper 134 may include, but is not limited to, mixers and related mixing equipment. Mixing hopper 134 may be used to add additives to drilling fluid 122.

Drilling system 100 includes a base station 142 comprising a motor 160, a base station controller 162, a power source 164, and a cable system 143. IIOT devices 170A, 170B, 170C can be coupled with the motor 160, the base station controller 162, and the power source 164. The cable system 143 can include power cables and data cables. The power cables can be used to power motors, pump, and the IIOT devices of the drilling system 100. The data cables can be used for the transmission of data variables and to power the IIOT devices. The motor 160 and controller 162 can be used to set the rate of rotation of the rotary table 112 and, therefore, the rate of revolution of the drill bit 114. The IIOT devices 170A, 170B, and 170C can be used to measure operating conditions of the motor 160, the base station controller 162, and the power source 164 and control operations of the drilling system 100. In some implementations, the base station controller 162 is configured to communicate with a cloud service provider of control system 10 through gateway 10A. In some implementations, the base station controller 162 is configured to communicate with a cloud service provider of control system 10 through a cellular network 166 and gateway 10B. In some implementations, the base station controller 162 is configured to communicate with a cloud service provider of the control system 10 through a satellite service provider network 168 and router 10C. Satellite service provider network 168 can provide Internet service, GPS based location service, or both.

The drilling system 100 can include a plurality of IIOT devices fitted to the drill string 108. The drill string 108 can include IIOT devices 180A, 180B, 180C, and 180D that can be used to generate information that can be used to determine location of the drill bit 114 and a location of a section of the drill string 108. The IIOT devices 180A, 180B, 180C, and 180D can be used to take temperature measurements at a location in the wellbore 116, pressure measurements at a location in the wellbore 116, chemical composition measurements at a location in the wellbore 116. IIOT devices 180A, 180B, 180C, and 180D can be used to measure rate of revolution, angle of orientation of the drill bit 114, or a combination of both. The IIOT devices 180A, 180B, 180C, and 180D can be fitted on the outer diameter of the drill string 108, on the inside diameter of the drill string 108, or combination of both. The IIOT devices 180A, 180B, 180C, and 180D can be a sensor, a controller, a relay, or a combination of any.

The base station controller 162 can communicate with a constellation of GPS satellites in order to determine the base station's coordinates based on known locations of the constellation of GPS satellites. Based on its own coordinates, the base station controller 162 can determine a location of the drill bit 114 or a section of the drilling string 108. Base station controller 162 using a signal having a known frequency rate, wavelength, and a time stamp can send the signal to any IIOT device 180A, 180B, 180C, and 180D using the cable system 163. One or more of the IIOT devices 180A, 180B, 180C, and 180D can respond with another time stamp indicating the time of receipt of the signal. In some instances, triangulation may need to be used to determine coordinates of a targeted IIOT sensor. Base station controller 162 can select, based on a map of the layout of the devices, one or more IIOT devices 180A, 180B, 180C, and 180D as relays. Base station controller 162 sends the signal to a selected relay or relays. The target relay or relays returns a time stamp indicating the time the signal was received to base station controller 162 and relays the signal to a target IIOT device. The target IIOT device, in turn, returns a time stamp to the base station controller 162 indicating the time the signal was received. Based on the known frequency rate, wavelength, time stamp information, known location of the IIOT relay device or devices (a reference point), and coordinates of the base station controller 162, the base station controller 162 can determine the location of the targeted IIOT device using triangulation.

Additional IIOT devices that can be fitted to the drilling system 100. IIOT device 190A can be a relay device used as a known reference point by the base station controller 162. IIOT device 190B can be fitted to, i.e. coupled with, the rotary table 112. The IIOT device 190B can be used to measure the rate of revolution of the rotary table 112 or motion of the rotary table 112. It should be understood that the IIOT device 190B can be mounted at a fixed reference point in reference to the rotary table 112. IIOT device 200A can be used to measure the vertical motion and the rate of motion of the kelly drive 110. IIOT device 200B can be used to measure the vertical motion and rate of motion of the traveling block 106. IIOT device 210A can be used to measure the flow rate of the drilling fluid 122 going into the fluid processing units 150. The IIOT device 210A can be used to measure the chemical composition of the drilling fluid 122 going into the fluid processing units 150. The IIOT device 210B can be used to measure the flow rate of the drilling fluid 122 coming out of the retention pit 132. The IIOT device 210B can be used to measure the chemical composition of the drilling fluid 122 coming out of the retention pit 132. The IIOT device 210C can be used to measure operational characteristics of the pump 120. IIOT device 210D can be used to measure flow rate of the drilling fluid 122 coming out of the pump 120.

Measurement variables generated by the IIOT devices can include registration information, such as a session key, for a cloud service provider and an application service provider, one or more IP addresses, an access network identifier, a cloud service provider identifier, an application service identifier, a well site identifier, well site operation identifier, monitored equipment identifier, an IIOT device identifier, an IIOT device type, a measurement, or any combination thereof. It should also be understood that any variable parameter, value, or both could be encrypted. Based on measurement variables, a cloud service provider can return control variables generated by the data preprocessing modules 12 and the predictive engines 14. The control variables can include registration information, such as a session key, for a cloud service provider and an application service provider, one or more IP addresses, an access network identifier, a cloud service provider identifier, an application service identifier, a well site identifier, well site operation identifier, monitored equipment identifier, an IIOT device identifier, an IIOT device type, a measurement, or any combination thereof. It should also be understood that any variable parameter, value, or both could be encrypted. The control variables can be used for a variety of functions. The control variables can simply be used for informative purposes. The control variables can be used to control equipment operations.

Figure 2:
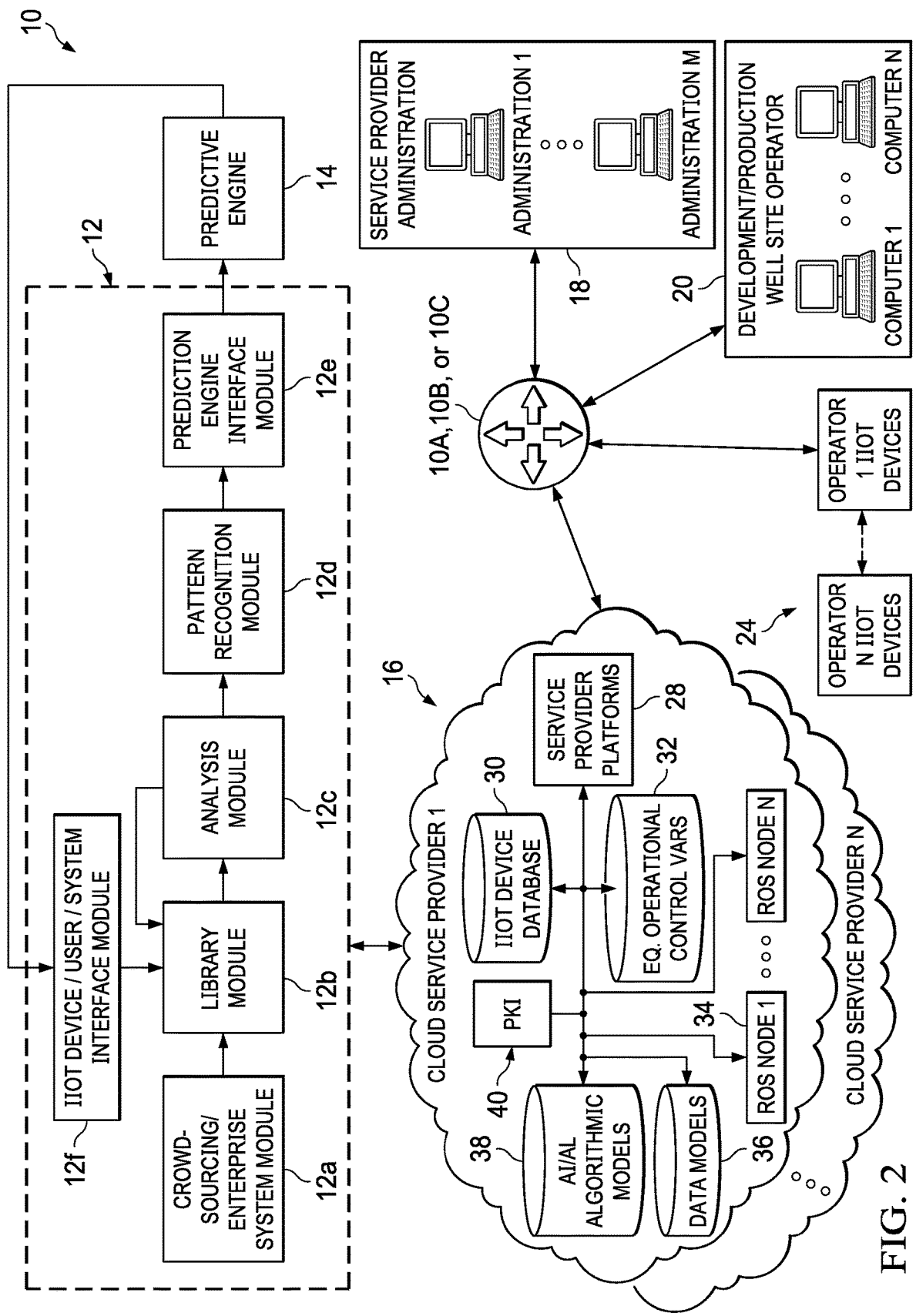
FIG. 2 is an illustration of a diagram of the control system of FIG. 1, in accordance with certain example embodiments.

Referring now to FIG. 2, illustrated is a diagram of control system 10, in accordance with example embodiments. The control system 10 comprises one or more data preprocessing modules 12, predictive engines 14, at least one cloud service provider 16 with the one or more data preprocessing modules 12 and predictive engines 14 executable therein, well site control and operations center 18, and one or more operator IIOT devices. The control system 10 generates predictive results based on a plethora of information from various sources and generates control variables used to control equipment of the drilling system 100 based on these predictive results. The control system 10 classifies sources of information, information sourced, predictive results, control variables, and measurement variables and catalogues the classified entities based on a well site identifier, a well site operation, monitored equipment identifier, whether the monitored equipment requires real-time communications and control, an IIOT device identifier, an IIOT device type, or any combination thereof.

The cloud service provider 16 can be network services provided by a well site operator, network services provided by third parties, such as Amazon Web Services (AWS®) and IBM Cloud Managed Services®, or a combination thereof. Service provider services can include service provider platforms 28, a IIOT device database 30, equipment measurement and operational control variables database 32, Robot Operating System (ROS) nodes 34, a data models database 36, an Artificial Intelligence (AI)/Machine Learning (ML) algorithmic models database 38, and a PKI (Public Key Infrastructure) database 40. Obviously, depending on the service provider, not all features may be present. The service (cloud) provider platforms 28 can be any OS that provides base OS application services, such as database application services, DNS application services, messaging services, and PKI application services.

The data preprocessing module 12 comprises a crowd-sourcing, personnel, and enterprise system module 12a, a library module 12b, an analysis module 12c, a pattern recognition module 12d, a predictive engine interface module 12e, and a IIOT device, user, and system interface module 12f. In practice, the system 10 can generate an instance of a well site operation, an instance of a well site operation procedure, which is a sub-operation of the well site operation, a predictive result or results for the instance or instance, and a quality assessment of the predictive result or results based on defined criteria or criterion and sourced information. As an example, a well site operation could be a drilling operation using a particular piece of equipment for a particular location and a well site procedure could be a formation packing operation or formation perforation operation associated with the drilling operation. Stated differently, a well site operation can be, as an example, a combination of a well state and a rig state, such as low pressure zone and tripping or hard stringers and on bottom, drilling, circulating, and the well site operation procedure can be, as an example, tag bottom, break gels, drill a stand, or trip a stand, or any combination thereof. The instance in this case is an instantiation that includes structured details of the operation, procedure, or both. In addition, the system 10 can create a standardized library of historical instances, predictive results, and associated information and analysis. Statistical techniques, such as machine learning based statistical techniques, can be used to generate collection of relevant data variables in response to subsequent instantiations. The collection of data variables can be used to generate new predictive results used in the automated control well site operation equipment.

The crowd-sourcing, personnel, and enterprise system module 12a is used to process sourced information. The sourced information can be used to provide information that enhances stored, historical instantiated data variables and assess, comment, modify, or any combination thereof of the quality of stored, predictive results. The crowd-sourcing, personnel, and enterprise system module 12a can be notified automatically when there is an update to a crowd-sourcing, personnel, and enterprise system source. The crowd-sourcing, personnel, and enterprise system module 12a can use a web bot to search crowd-sourcing, personnel, and enterprise system sources. The web bot can be triggered automatically based on an update to the library module 12b, periodically based on a set date and time, or manually.

The IIOT devices 24 and well site control and operations center 18 are communicable coupled together and each is coupled to the data preprocessing module 12 through the IIOT device, user, and system interface module 12f. The IIOT devices 24 can be communicable coupled to the well site control and operations center 18 and the data preprocessing module 12 using a highly efficient, low latency processing and communication system to send and receive high volume, high velocity data variables in real-time, or near real-time. Variables from the IIOT devices 24 can be automatically pushed to the IIOT device, user, and system interface module 12f. Some variables may not require to be automatically pushed but rather can be stored and polled for when needed or automatically retrieved after a period of time. This may be needed at times when the control system 10 is under heavy loads. The IIOT device, user, and system interface module 12f can automatically notify the library module 12b upon receiving a data variable, e.g. when a well site operation begins, and when measurement variables are designated as requiring real-time control of equipment.

The data variables can comprise well site operation variables that identify a well site, a well site operation, a well site operation procedure, a predictive result, and a predictive result accuracy. The data variables can comprise an operating procedure variable that identifies a standard operating procedure or a deviated operating procedure. The data variables can include IIOT device variables that identify parameter and values the IIOT devices are configured for. The data variables can comprise measurement and control variables that identify equipment and equipment measurement and control information. The equipment control information is based on a predictive result or results generated by the predictive engine 14. The data variables can comprise known risk variables that identify known risks of a well site operation or well site operation procedure. The data variables can comprise predictive result variables that identify predictive results. The data variables can comprise predictive accuracy variables that identify a predictive result and accuracy of the predictive result. The data variables can comprise input from various sources. The input can include review or quality assessments, as an example, from crowd sourced user input, equipment identifiers from an enterprise data system, and input from SME's.

The data variables can be communicated from IIOT device, user, and system interface module 12f and the crowd sourcing, personnel, and enterprise system module 12a to the library module 12b. Control variables can be communicated directly from the predictive engine 14 to the IIOT devices 24. The predictive engine 14 can be communicable coupled to the IIOT devices 24 using a highly efficient, low latency processing and communication system to send and receive high volume, high velocity data variables in real-time. In some situations, control variables can be communicated directly from the well site operations and control center 18. Personnel can review and modify sensor variables, control variables, and predictive results before releasing information used to control monitored equipment.

The library module 12b determines a class of the data variables based on defined categories and sub-categories. The categories and sub-categories can be defined according to at least one selected from a group comprising a well site operation, standard industry (best) practice for the well site operation, actual practice for the well site operation, deviated practice for the well site operation, a well site operation procedure, standard industry (best) practice for the well site operation procedure, actual practice for the well site operation procedure, deviated practice for the well site operation procedure, equipment identification, equipment performance status (measurements), known risk factor, a predictive result, accuracy of a predictive result, estimated cost of an operation, estimated cost of a procedure, actual cost of an operation, actual cost of a procedure, wellbore development production time, wellbore non-production time, estimated wellbore production, actual wellbore production, crowd-sourcing information, performance or performances of the well site operation, input or knowledge from user input, Subject Matter Experts (SMEs), input from enterprise systems, strength of relationships between entries. Classified variables are then stored based on the categories and sub-categories for scoring, indexing, and searching. It should be understood that the number of variables stored can be considered Big Data. Big Data can comprise hundreds of thousands and even millions of rows, columns, or both of variable parameters, values, or both.

The well site operation, standard industry (best) practice for the well site operation, actual practice for the well site operation, deviated practice for the well site operation, a well site operation procedure, standard industry (best) practice for the well site procedure, actual practice for the well site operation procedure, deviated practice for the well site operation procedure, equipment identification, equipment performance status, estimated cost of an operation, estimated cost of a procedure, actual cost of an operation, actual cost of a procedure, crowd-sourcing information, performance or performances of the well site operation, input or knowledge from user input, Subject Matter Experts (SMEs), known risk factors, and input from enterprise systems can be scored based on accuracy of the predictive results, quality assessment of classified variables based on sourced input, or both.

The analysis module 12c can include a scoring component. The analysis module 12c can evaluate at least one of the classified entries in the library module 12b and provide a ranking based on accuracy of the predictive results, quality assessment, or both. In essence, the analysis module 12c introduces a ranking of the classified entries that can be used by the pattern recognition module 12d. The pattern recognition module 12d uses an instantiated operation, procedure, or both to create a collection of historical references that are relevant to the operation, procedure, or both. The collection of references can be used by the predictive engine 14 to generate a more accurate predictive result for the instantiated well site operation and procedure.

In practice, the library module 12b and the analysis module 12c continuously execute to create the classified entries and scores through the duration of a well site operation. The library module 12b, the analysis module 12c, or both can be triggered to create classified entries and scores based on an elapsed time period, entry additions or entry updates based on sourced information, or manually. The analysis module 12c can create an array of indexes and sub-indexes in response to, e.g., instantiation of a well site operation, a well site operation procedure, and equipment status information. The analysis module 12c can be triggered to create an array, e.g., using event notifications that are based on an update to the library module 12b or select updates to the library module 12b. Additionally, the analysis module 12c can be triggered to search the library module 12b based on an elapsed time period, status updates to specific equipment, or manually.

The array can identify an instantiated well site operation or a instantiated well site operation and well site operation procedure and other historical well site operations and well site operation procedures that have similar characteristics by searching the library module 12b for classified variables stored under the defined categories and sub-categories. However, the array does not need to depend on a well site operation or well site operation procedure. In other words, the array can include an equipment identifier, e.g., where the array entries are not based on any particular operation or procedure but rather performance status of the equipment. Additionally, although in practice two particular well site operations may be different, a sub-category or categories may be similar. The analysis module 12c can be configured to create an array or add to the array if two categories, whether the same or different, have at least one similar sub-category. Obviously, entries having a strength of relationships between entries or strengths of relationships between entries can be used to streamline the process of creating an array. It should be understood and will be discussed below that a requirement for a degree of strength of relationship may be different for different entries. This can be dependent upon the entries and the criteria or criterion.

The pattern recognition module 12d uses statistical analysis, such as AI based machine learning statistical techniques, to process the array. Cluster analysis can be performed on the array to identify strength of relationships between the classified entries. The pattern recognition module 12d can quantify the strengths between classified entries based on a defined criteria or criterion. As an example, the pattern recognition module 12d can create a cluster of data variables by performing cluster analysis on at least one selected from a group comprising standard industry (best) practice for a well site operation, standard industry (best) practice for a well site operation procedure, actual practice for the well site operation, actual practice for the well site operation procedure, deviated practice for the well site operation, deviated practice for the well site operation procedure, estimated costs, actual costs, known risk factors, wellbore development production time, wellbore non-production time, estimated wellbore production, actual wellbore production, historical and comparable wellbore production, equipment performance status, quality of crowd-sourcing information, performance or performances of any of the well site operation and procedures; quality of input or knowledge from user input, quality of Subject Matter Experts (SME), and quality of input from enterprise systems.

The pattern recognition module 12d can be set to filter the clustered result based on a criteria, such as a required prediction accuracy level, quality level, known risk factors, or any combination thereof. As previously stated, the stored, classified entries can comprises millions of rows, columns, or both of data variables. As such, the analysis module 12c can be configured to sample the stored entries to create the array as opposed to performing an entire search of the stored entries. Furthermore, the entries having a strength of relationships between entries or strengths of relationships can reduce the processing resources and time needed to create the cluster.

The predictive engine interface module 12e is configured to communicable couple the filtered, clustered results to the predictive engine 14. The predictive engine interface module 12e can automatically communicate the filtered, clustered results to the predictive engine 14 or can be triggered to communicate the filtered, clustered results to the predictive engine 14. It should be understood that in practice the predictive engine 14 may be integrated as a software module of the data preprocessing module 12, i.e. a component part of the data preprocessing module 12 accessible over a local loop, or accessible over a networked connection. The predictive engine 14 can be any $3^{rd}$ party software solution configured to perform complex, predictive analysis on the filtered, clustered results. The data preprocessing module 12, the predictive engine 14, or both can be executable in a clustered computing environment. The predictive engine 14 uses AI based algorithmic models to build a sensitivity data model of a multidimensional response to input variables from the data preprocessing module 12. As an example, the input variables from the data preprocessing module 12 can include an objective variable, such as to increase in ROP (Rate of Penetration), decrease MSE (Mechanical Specific Energy) or to stabilize downhole cleaning. The predictive engine 14 can then use the sensitivity model to determine optimal parameters and values to be to be used to control machinery to achieve the desired outcome.

Figure 3:
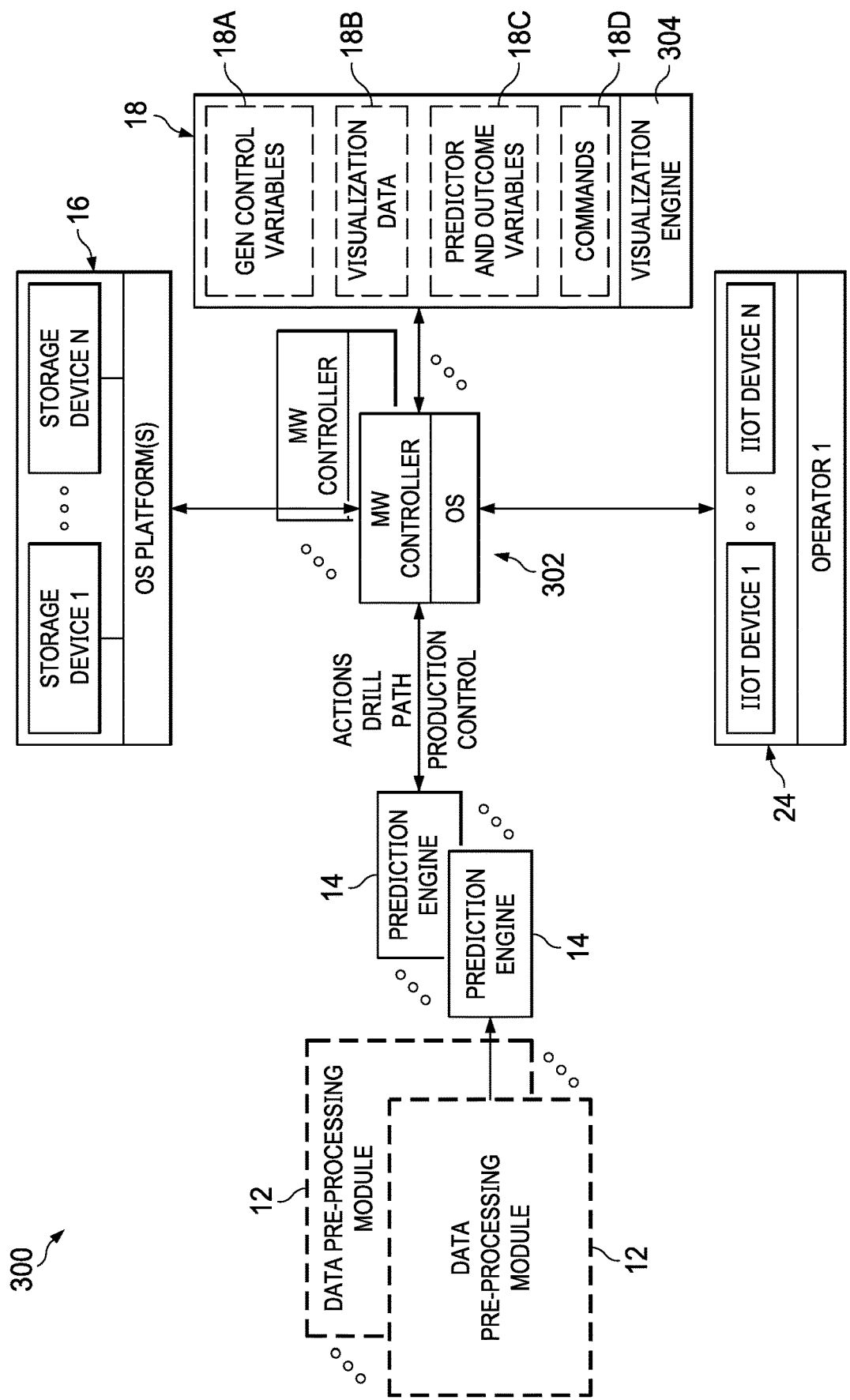
FIG. 3 is an illustration of a block diagram of a system stack for a distributed computing environment and communicable coupled components for generating predictive variables used in the management and control of drilling operations of a well site, in accordance with certain example embodiments.

Referring now to FIG. 3, illustrated is a block diagram of a system stack for a distributed computing environment and communicable coupled components for generating predictive variables used in the management and control of drilling operations of a well site, in accordance with example embodiments, denoted generally as 300. The system stack 300 can be a clustered computing environment. The system stack 300 can be executed on a hardware node, partitions of a hardware node, a plurality of hardware nodes, or a combination thereof. The system stack 300 includes a hardware node having an executable partition or plurality of executable partitions, such as containers or virtualized systems, dedicated to processing complex analytics or performing other associated functions. In the case of containers, the partition or partitions have dedicated and shared resources. The partition or partitions have OS kernel space and user space applications, or at least kernel space applications. OS kernel space and user space applications that are shared are read only. In the case of the virtualized system, each executable partition uses its own dedicated OS and hardware resources. A virtualized system does not share software resources with other partitions. An example use case in cloud services environment can be to install analytic tools in dedicated containers to perform complex analytics operations and install auxiliary services, such as database management and communication security services, on virtualized systems. Partitions in this context refers to computing resources, such as memory space, disc space, computing resources, and file space.

The system stack 300 includes at least one node system stack 302 and at least one data pre-processing module 12 and at least one predictive engine 14. Components coupled to the system stack 300 can comprise services from cloud service 16, operations center 18, and an operator's IIOT devices 24. Each node system stack 302 comprises at least one Operating System (OS) and a middleware controller. Depending on the particular process or processes within the context of the node system stack 302, the node system stack 302 may not include an OS but rather only the middleware controller. In this case, the middleware controller is fitted with code to perform a particular process of, e.g., the predictive engine 14. The middleware controller is a software component that is operable on a node, e.g. ROS nodes 34, between a physical layer and user space applications and/or certain OS kernel applications. The physical layer being a software and hardware layer that provides necessary details of how to interface data through a transmission medium. Common middleware components include the MAC (Medium Access Control) layer, network layer, and transport layer of the OSI (Open Systems Interconnection) model. An example of the middleware controller is the open source Robot Operating System (ROS).

A function of the ROS nodes 34 is to perform complex analytics, generate control variables, store said variables, and manage drilling operations. A function of the ROS based node system stack 102 is to integrate nodes and partitions within the clustered computing environment by managing Inter Process Communications (IPC). In effect, the middleware controller, at minimum, is a scheduler for a clustered computing environment. IPC in this context can be communications between processes instantiated on the same node, e.g. over a local loop or in memory, partitions of the same node, and nodes and partitions on a network. Instantiated processes can be a process of a data preprocessing module 12, predictive engine 14, other middleware components, and various OS kernel and user space applications.

The node(s) and partitions can be set to execute an instance of the data preprocessing module 12. However, the node(s) and partitions can be dedicated to executing a process or processes of the data preprocessing module 12. As an example, a cluster of nodes and partitions can be dedicated to executing the pattern recognition module 12d, i.e. a particular process of the data preprocessing module 12, and another cluster dedicated to executing the predictive engine 14. Obviously, the nodes and partitions can be clustered based on a more specific process. As an example, some nodes and/or partitions can be dedicated to particular complex analytics, such as Bayesian optimization. In any event, the middleware controller of the ROS based node system stack 302 and the node(s) and partitions are configured to share messages between executing entities to accomplish an analytics goal and provide control variables for managing well site operations. Furthermore, nodes and partitions can be set up and designated as preforming analytics operations, such as a node and partition configured as the data preprocessing module 12 or predictive engine 14, or sub-process of such, or system control operations, such as controlling drilling operations of a particular machine for a particular site.

A visualization engine 304 can be used to display the generated control variables 18A and other relevant data. The visualization engine can generate a graphical display 18B of the generated control variables 18A in real-time or near real-time and can display the control variables in graphs, charts, or any other type of visualization typically used in visualization platforms. The visualization engine is also configured to retrieve information from a storage device of cloud service provider 16, such as information generated by library module 12b. In an embodiment, a user or consumer can define the predictive and outcome variables 18C used in, e.g., the pattern recognition module 12d. In another embodiment, the predictive and outcome variables 18C can be predefined, e.g. using a-prior models and control variables. The user also can issue commands in order to change or adjust the actions and drill path based on other information, e.g. information from a SME.

Figure 4:
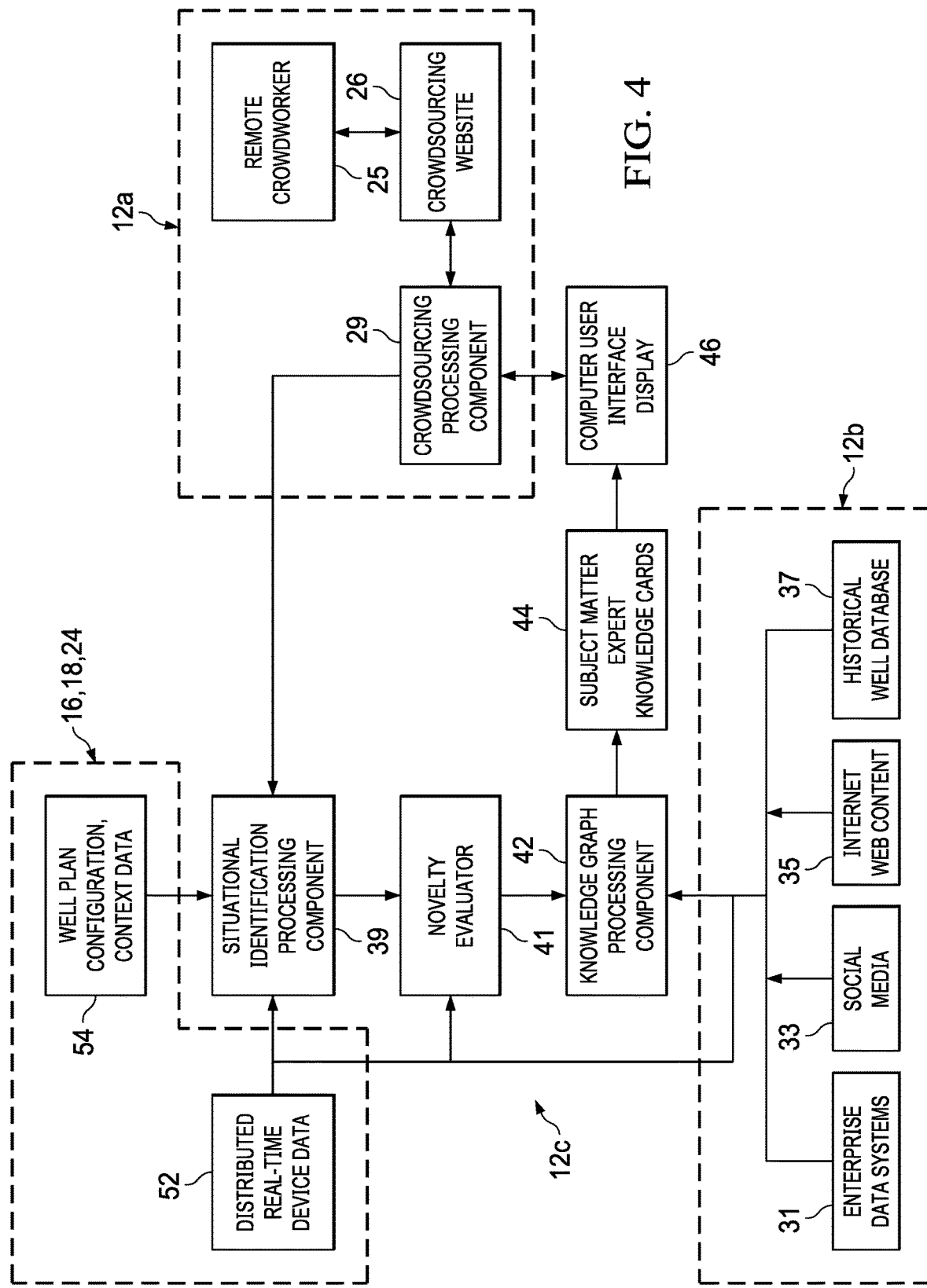
FIG. 4 is an illustration of a flow diagram of an algorithm for performing functional features of a crowd-sourcing module, a library module, the analysis module, and a sensor, user, and system interface module of a data preprocessing module of the control system of FIG. 1 and FIG. 2, in accordance with example embodiments.

Referring now to FIG. 4, illustrated is a flow diagram of an algorithm for performing functional features of the crowd-sourcing module 12a, the library module 12b, the analysis module 12c, and the IIOT device, user, and system interface module 12f of the data preprocessing module 12, according to certain example embodiments. The algorithm comprises features of the crowd-sourcing module 12a, the library module 12b, the analysis module 12c, and IIOT device, user, and system interface module 12f capable of performing the various tasks described below.

The crowd-sourcing module 12a comprises processing procedures to collect and process data from a crowd-sourcing website 26 using a crowd-sourcing processing unit 29. The library module 12b comprises processing procedures to store and manage data from at least one enterprise data system 31, social media 33, the Internet 35, and historical well site database or databases 36. The analysis module 12c comprises processing procedures for a situational identification-processing component 39, a novelty evaluator component 41, knowledge graph processing component 42, Subject Matter Expert (SME) knowledge component 44, and a user interface display component 46. The IIOT device, user, and system interface module 12f comprises processing procedures to collect real-time IIOT device data 52 and well plan, configuration, and context data 54.

The algorithm, in essence, evaluates an instantiated wellbore operation, procedure, or both, or any classified entry to determine a collection of relevant data variables that can be used by an SME or SME's to refine. The instantiated wellbore operation, procedure, or both, or any instantiated classified entry and the relevant collection of data can be provided to the pattern recognition module 12 for further processing. In addition, the refined instantiated wellbore operation, procedure, or both, or any classified entry can be provided to the pattern recognition module 12 for further processing. The SME or SME's can be considered the arbiter of a particular instantiation. The SME or SME's can resolve any identified issues or problems in the instantiation, collection of relevant data variables, or both, or the any instantiated classified entry and collection of relevant data variables. The SME or SME's can also modify or add to the instantiation, collection of relevant data variables, or both, or the any instantiated classified entry and collection of relevant data variables.

The algorithm begins at the situational identification component 39. The situational identification component 39 identifies an instantiated well site operation, a well site operation procedure, or both, or any other instantiated entry and groups the instantiation with a collection of relevant input data for further processing. The situational identification component 39 processes input data that includes data variables from the crowd-sourcing module 12a, the library module 12b, and the well site sensor bank 16 and the well site control and operations center 18. The data variables can include crowdsourcing data, well plan, configuration, and context data, sensor data, and historical data received from a crowdsourcing processing component 29, received at a crowdsourcing website 26 from a remote crowdsourcing user 25, historical data, a well plan, configuration, and context data component 54, and an IIOT device data component 52. The historical data is received from an enterprise data system component 30, social media component 33, Internet web content component 35, and well database component 37.

The algorithm continues at a novelty evaluator component 41. The novelty evaluator component 41 determines a uniqueness of the instantiated well site operation, a well site operation procedure, or both, or any other instantiated entry and the collection of relevant data. The novelty evaluator scores the uniqueness of the instantiation by evaluating similarities between the collection of relevant data and the instantiation. The score can be determined based on a threshold value, e.g. 2000 similar features between the collection and the instantiation. Comparisons that do not meet a defined threshold are not considered for further processing. Stated differently, if the size of the collection does not meet a minimal threshold, the instantiation and relevant data are not considered for further processing.

The algorithm continues at the knowledge graph processing component 42. The knowledge graph processing component 42 processes qualified instantiations and the collection of relevant data. The knowledge graph processing component 42 evaluates the qualified instantiation and the collection of relevant data and, optionally, identifies an SME or SME's. As an example, the enterprise data system 30 or the social media component 33 can be used to identify an SME or SME's based on keywords associated with an instantiation, collection of relevant data, or both. The SME or SME's can be associated with a subject matter expert knowledge card or cards 44. The knowledge card or cards 44 can be pushed, or otherwise made available, to each SME through the crowd-sourcing module 12a. Obviously, the cards can be a type of network communications message, such as email. As previously stated, the SME or SME's input is optional. However, the SME or SME's can make modifications to the collection of relevant data or simply add additional information.

Figure 5:
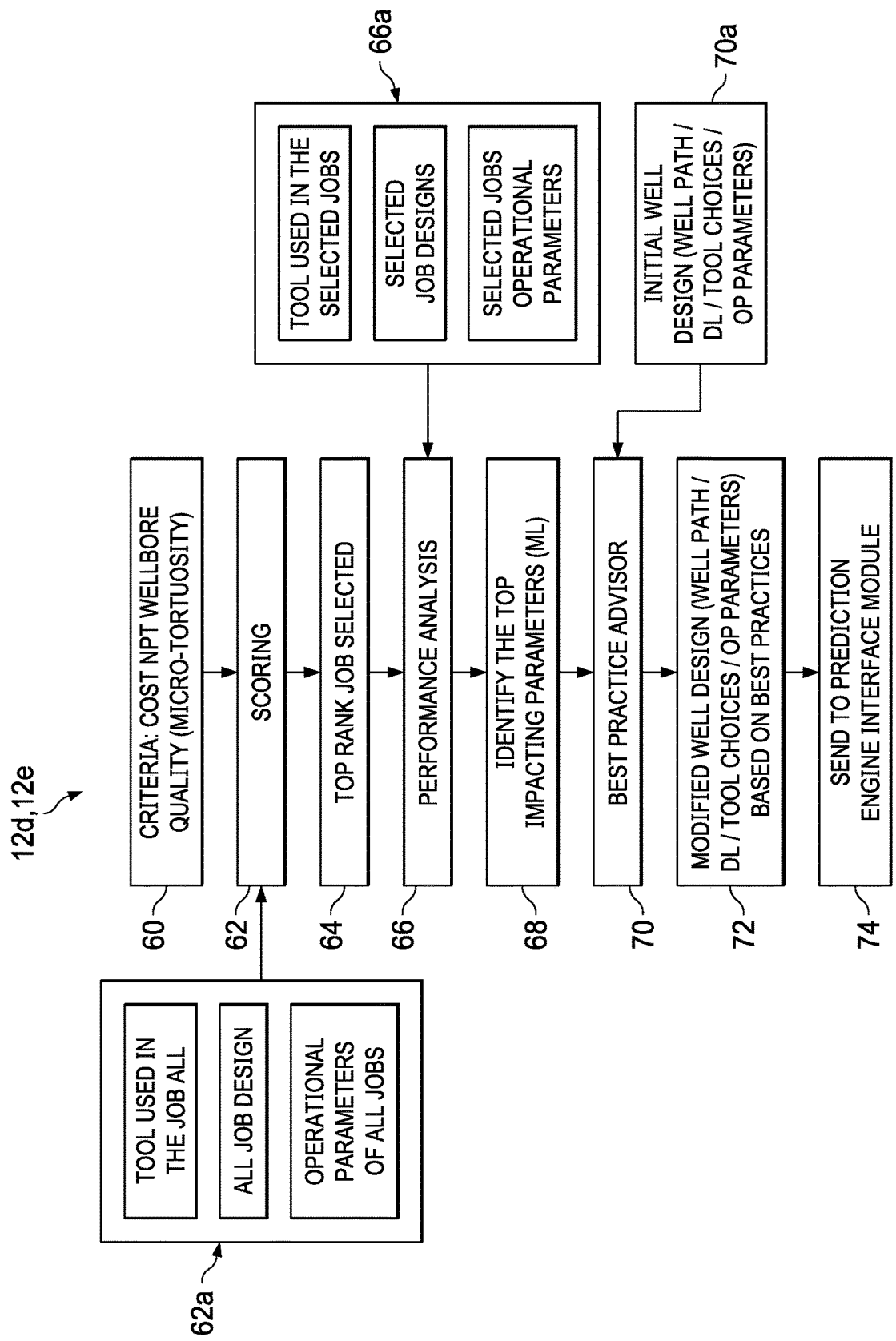
FIG. 5 is an illustration a flow diagram of another algorithm for performing functional features of the analysis module, pattern recognition module, and a predictive engine interface module of the data preprocessing module, in accordance with example embodiments.

Referring now to FIG. 5, illustrated is a flow diagram of another algorithm for performing functional features of the analysis module 12c, pattern recognition module 12d and the predictive engine interface module 12e of the data preprocessing module 12, according to certain example embodiments. The algorithm comprises executable processing procedures for a wellbore-variable and criteria component 60, a scoring component 62, a job(s) selection component 64, a performance analysis component 66, an impacting parameters component 68, a best practice advisor component 70, an initial well design component 70a, a modified well design component 72, and a predictive engine communications component 74.

The algorithm begins at the wellbore-variable and criteria component 60. The wellbore-variable and criteria component 60 evaluates the qualified instantiation, the collection of relevant data, or the SME or SME's refined qualified instantiation and collection of relevant data, and identifies a criteria or criterion. The algorithm continues at the scoring component 62. The scoring component 62 ranks the collection of relevant data, or the SME or SME's refined collection of relevant data, using the identified criteria or criterion. Statistical analysis, such as an AI based machine learning techniques or techniques, can be used to rank the collection of relevant data, or the SME or SME's refined qualified instantiation and collection of relevant data, using the identified criteria or criterion. As an example, cluster analysis can be used to rank the collection of relevant data based on the criteria or criterion selected. Stated differently, cluster analysis can be used to rank the collection of relevant data variables based on the criteria or criterion selected. The algorithm continues at the job(s) selection component 64. Job as used herein is in reference to any of the classified entries previously mentioned. The jobs that rank within a predefined threshold can be selected for further processing. The algorithm continues at the performance analysis component 66. The performance analysis component 66 uses statistical analysis, such as an AI based machine learning techniques or techniques, on the data variables associated with the job or jobs to identify strength of relationships between the qualified instantiation, the collection of relevant data, or the SME or SME's refined qualified instantiation and collection of relevant data. The algorithm continues at the impacting parameters component 68. Based on the data variables evaluated, the impacting parameters component can reference a value based index that identifies a predefined threshold. The predefined threshold can be used to identify the top impacting variables. The algorithm continues at the best advisor component 70. The best advisor component 70 identifies the predictive engine 14 based on the qualified instantiation and configures a communications message to include the address of the predictive engine 14 and the top impacting variables. The base advisor component 70, based on the top impacting parameters and the initial well design (well path//DL/Tool Choices/OP parameters) 70a, generates a modified well design based on the top impacting parameters and best practices 72. The modified well design 72 is interfaced with the predictive engine communications component 74 where the communications message is processed and sent to the predictive engine 14.

It should be understood that depending on parameter space of data variables being processed, either statistical analysis or machine learning based statistical analysis can be used to identify variables having common characteristics and to determine strength of relationships between those variables. If the number of variables being considered for analysis are not considered Big Data and can be statistical processed within an acceptable time frame with reasonable computational resources, the use of machine learning based statistical techniques may not be needed. The use of machine learning based statistical techniques is subjective and can be set based on a predefined threshold. Stated different, the system 10 can be configured to employ the use of machine learning based statistical techniques if the data variables stored in the library module exceeds a certain threshold or if collected, relevant data variables exceed a certain threshold.

Figure 6:
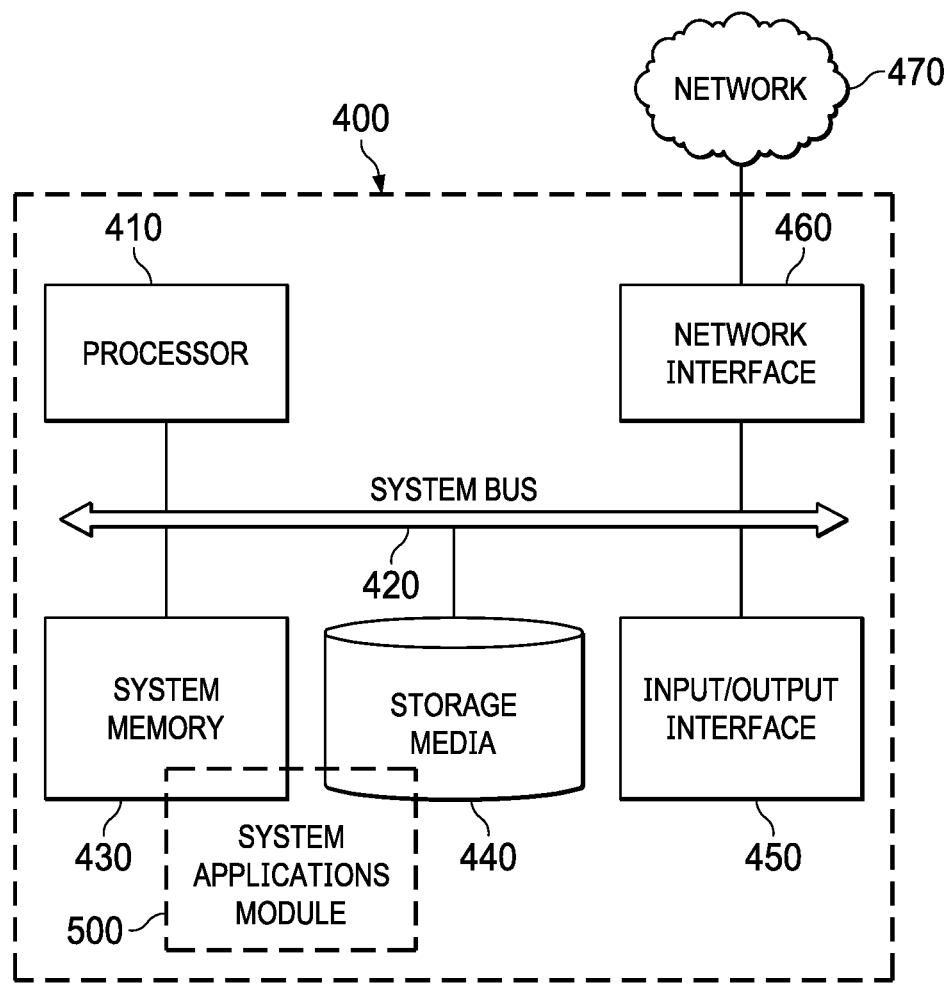
FIG. 6 is an illustration of a diagram of a computing machine and a system applications module, in accordance with certain example embodiments.

Referring now to FIG. 6, illustrated is a computing machine 400 and a system applications module 500, in accordance with example embodiments. The computing machine 400 can correspond to any of the various computers, mobile devices, laptop computers, servers, embedded systems, or computing systems presented herein. The module 400 can comprise one or more hardware or software elements designed to facilitate the computing machine 400 in performing the various methods and processing functions presented herein. The computing machine 400 can include various internal or attached components such as a processor 410, system bus 420, system memory 430, storage media 440, input/output interface 450, and a network interface 460 for communicating with a network 470, e.g. a loopback, local network, wide-area network, cellular/GPS, Bluetooth, WIFI, and WIMAX.

The computing machine 400 can be implemented as a conventional computer system, an embedded controller, a laptop, a server, a mobile device, a smartphone, a wearable computer, a customized machine, any other hardware platform, or any combination or multiplicity thereof. The computing machine 400 and associated logic and modules can be a distributed system configured to function using multiple computing machines interconnected via a data network and/or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machines. The processor 410 can be a general purpose processor, a processor core, a multiprocessor, a graphics processor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a software based or hardware based virtualized computing machine executing within one or more other computing machines.

The system memory 430 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 430 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 430. The system memory 430 can be implemented using a single memory module or multiple memory modules. While the system memory 430 is depicted as being part of the computing machine, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules, data, or any other information. The storage media 440 can be part of, or connected to, the computing machine. The storage media 440 can also be part of one or more other computing machines that are in communication with the computing machine such as servers, database servers, cloud storage, network attached storage, and so forth.

The applications module 500 can comprise one or more hardware or software elements configured to facilitate the computing machine with performing the various methods and processing functions presented herein. The applications module 500 can include one or more algorithms or sequences of instructions stored as software or firmware in association with the system memory 430, the storage media 440 or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the applications module 500 can comprise a computer software product. It should be appreciated that a computer software product comprising the applications module 500 can also be associated with one or more processes or methods for delivering the applications module 500 to the computing machine 400 via a network, any signal-bearing medium, or any other communication or delivery technology. The applications module 500 can also comprise hardware circuits or information for configuring hardware circuits such as microcode or configuration information for an FPGA or other PLD. In one exemplary embodiment, applications module 500 can include algorithms capable of performing the functional operations described by the flow charts and computer systems presented herein.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine or the processor 410. The I/O interface 450 can be configured to communicate data, addresses, and control signals between the peripheral devices, the computing machine, or the processor 410. The I/O interface 450 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine, or the processor 420.

The I/O interface 420 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 420 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the network interface 460 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 410 can be connected to the other elements of the computing machine or the various peripherals discussed herein through the system bus 420. It should be appreciated that the system bus 420 can be within the processor 410, outside the processor 410, or both. According to some embodiments, any of the processors 410, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus comprising: a plurality of devices, each device having a processor and mounted to equipment of a drilling system, configured by a processor to: generate at least one selected from a group comprising a relay variable, a measurement variable, and a control variable; generate a message having a device address, a network address, or both; a library module configured by a processor to: classify the relay variable, the measurement variable, or the control variable based on a parameter, a value, or both; identify a category or a category and sub-category from a plurality of categories and sub-categories based on the parameter, the value, or both; catalogue the relay variable, the measurement variable, or the control variable based on the category or the category and the sub-category; an analysis module configured by a processor to: select from a library of catalogued relay variables, measurement variables, and control variables, at least one selected from a group comprising a parameter and a value; and a pattern recognition module configured by the processor to: identify at least one pattern using a statistics based algorithm, the statistics based algorithm using a standard operating procedure, classified procedures and recommendations, at least one semantic category, and the at least one selected from the group comprising the parameter and the value, the at least one pattern indicating a deviation in the standard operating procedure;

Clause 2, the apparatus of clause 1, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value;

Clause 3, the apparatus of clause 2, where the relay variable comprises an additional variable having a parameter indicating the variable as a location variable and a value indicating a location and equipment of the drilling system;

Clause 4, the apparatus of clause 1, further comprising at least one gateway configured to communicate the relay variable, the measurement variable, the control variable, or any combination thereof over at least one selected from a group comprising the Internet, an intranet, a data network, a satellite network, and a cellular network to at least one selected from a group comprising a cloud service provider, a load balancing node, and an application processing node;

Clause 5, the apparatus of clause 1, further comprising a cloud service provider, the cloud service provider comprises one or more middleware layer based load balancers, data pre-processing modules, and one or more predictive engines, the one or more middleware layer based load balancers communicable coupled with the data pre-processing modules and the predictive engines, each data pre-processing module communicable coupled with a predictive engine;

Clause 6, the apparatus of clause 5, wherein the library module, the analysis module, and the pattern recognition module are parts of each data pre-processing module;

Clause 7, the apparatus of clause 5, wherein the middleware layer based load balancer is an ROS node;

Clause 8, a system comprising: equipment used to control a process of drilling a wellbore into a subterranean formation; a plurality of devices with one or more devices coupled to each piece of equipment, each device having a processor and configured by the processor to: generate at least one selected from a group comprising a relay variable, a measurement variable, and a control variable; generate a message having a device address, a network address, or both; a library module configured by a processor to: classify the relay variable, the measurement variable, or the control variable based on a parameter, a value, or both; identify a category or a category and sub-category from a plurality of categories and sub-categories based on the parameter, the value, or both; catalogue the relay variable, the measurement variable, or the control variable based on the category or the category and the sub-category; an analysis module configured by a processor to: select from a library of catalogued relay variables, measurement variables, and control variables, at least one selected from a group comprising a parameter and a value; a pattern recognition module configured by the processor to: identify at least one pattern using a statistics based algorithm, the statistics based algorithm using a standard operating procedure, classified procedures and recommendations, at least one semantic category, and the at least one selected from the group comprising the parameter and the value, the at least one pattern indicating a deviation in the standard operating procedure; and a predictive engine configured by a processor to: generate predictive results used to control at least one piece of equipment;

Clause 9, the system of clause 8, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value;

Clause 10, the system of clause 9, where the relay variable comprises an additional variable having a parameter indicating the variable as a location variable and a value indicating a location and equipment of the drilling system;

Clause 11, the system of clause 8, further comprising at least one gateway configured to communicate the relay variable, the measurement variable, the control variable, or any combination thereof over at least one selected from a group comprising the Internet, an intranet, a data network, a satellite network, and a cellular network to at least one selected from a group comprising a cloud service provider, a load balancing node, and an application processing node;

Clause 12, the system of clause 8, further comprises a cloud service provider, the cloud service provider further comprises one or more middleware layer based load balancers, data pre-processing modules, and one or more predictive engines, the one or more middleware layer based load balancers communicable coupled with the data pre-processing modules and the predictive engines, each data pre-processing module communicable coupled with a predictive engine;

Clause 13, the system of clause 12, wherein the library module, the analysis module, and the pattern recognition module are parts of each data pre-processing module;

Clause 14, the system of clause 12, wherein the middleware layer based load balancer is an ROS node;

Clause 15, a method comprising: generating, at a device mounted to equipment of a drilling system, at least one selected from a group comprising a relay variable, a measurement variable, and a control variable; generating, at the device mounted to equipment of the drilling system, a message having a device address, a network address, or both; classifying the relay variable, the measurement variable, or the control variable based on a parameter, a value, or both; identifying a category or a category and sub-category from a plurality of categories and sub-categories based on the parameter, the value, or both; cataloguing the relay variable, the measurement variable, or the control variable based on the category or the category and the sub-category; selecting from a library of catalogued relay variables, measurement variables, and control variables, at least one selected from a group comprising a parameter and a value; and identifing at least one pattern using a statistics based algorithm, the statistics based algorithm using a standard operating procedure, classified procedures and recommendations, at least one semantic category, and the at least one selected from the group comprising the parameter and the value, the at least one pattern indicating a deviation in the standard operating procedure;

Clause 16, the method of clause 15, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value;

Clause 17, the method of clause 16, where the relay variable comprises an additional variable having a parameter indicating the variable as a location variable and a value indicating a location and equipment of the drilling system;

Clause 18, the method of clause 15, further comprising communicating the relay variable, the measurement variable, the control variable, or any combination thereof over at least one selected from a group comprising the Internet, an intranet, a data network, a satellite network, and a cellular network to at least one selected from a group comprising a cloud service provider, a load balancing node, and an application processing node;

Clause 19, the method of clause 15, further comprising load balancing at least one selected from a group comprising a plurality of data pre-processing modules and a plurality of predictive engines; and Clause 20, the method of clause 19, wherein the library module, the analysis module, and the pattern recognition module are parts of each data pre-processing module.

What is claimed is:

1. An apparatus to control well site operations, comprising:
   a plurality of devices, each device having a processor and mounted to equipment of a drilling system, configured by a processor to:
      generate at least one selected from a group comprising a relay variable, a measurement variable, and a control variable;
      generate a message having a device address, a network address, or both;
   a library module configured by a processor to:
      classify the relay variable, the measurement variable, or the control variable based on a parameter, a value, or both;
      identify a category or a category and sub-category from a plurality of categories and sub-categories based on the parameter, the value, or both;
      catalogue the relay variable, the measurement variable, or the control variable based on the category or the category and the sub-category;
   an analysis module configured by a processor to:
      select from a library of catalogued relay variables, measurement variables, and control variables, at least one selected from a group comprising a parameter and a value;
   a pattern recognition module configured by a processor to:
      identify at least one pattern using a statistics based algorithm, the statistics based algorithm using a standard operating procedure, at least one semantic category, and the at least one selected from the group comprising the parameter and the value, the at least one pattern indicating a deviation in the standard operating procedure; and
   a predictive engine coupled to the pattern recognition module, to generate predictive results from the at least one pattern, the predictive results comprising at least one control variable to be communicated to at least one of the plurality of devices to control a portion of the well site operations.

2. The apparatus of claim 1, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value.

3. The apparatus of claim 2, where the relay variable comprises an additional variable having a parameter indicating the additional variable as a location variable and a value indicating a location and equipment of the drilling system.

4. The apparatus of claim 1, further comprising at least one gateway configured to communicate the relay variable, the measurement variable, the control variable, or any combination thereof over at least one selected from a group comprising an Internet, an intranet, a data network, a satellite network, and a cellular network to at least one selected from a group comprising a cloud service provider, a load balancing node, and an application processing node.

5. The apparatus of claim 1, further comprising a cloud service provider, the cloud service provider comprises one or more middleware layer based load balancers, data pre-processing modules, and one or more predictive engines including the predictive engine coupled to the pattern recognition module, the one or more middleware layer based load balancers communicable coupled with the data pre-processing modules and the one or more predictive engines, each data pre-processing module communicable coupled with a corresponding predictive engine in the one or more predictive engines.

6. The apparatus of claim 5, wherein the library module, the analysis module, and the pattern recognition module are parts of each data pre-processing module.

7. The apparatus of claim 5, wherein at least one of the middleware layer based load balancers comprises a Robot Operating System node.

8. A system to control well site operations, comprising:
equipment used to control a process of drilling a wellbore into a subterranean formation;
a plurality of devices with one or more devices coupled to each piece of equipment, each device having a processor and configured by the processor to:
generate at least one selected from a group comprising a relay variable, a measurement variable, and a control variable;
generate a message having a device address, a network address, or both;
a library module configured by a processor to:
classify the relay variable, the measurement variable, or the control variable based on a parameter, a value, or both;
identify a category or a category and sub-category from a plurality of categories and sub-categories based on the parameter, the value, or both;
catalogue the relay variable, the measurement variable, or the control variable based on the category or the category and the sub-category;
an analysis module configured by a processor to:
select from a library of catalogued relay variables, measurement variables, and control variables, at least one selected from a group comprising a parameter and a value;
a pattern recognition module configured by a processor to:
identify at least one pattern using a statistics based algorithm, the statistics based algorithm using a standard operating procedure , at least one semantic category, and the at least one selected from the group comprising the parameter and the value, the at least one pattern indicating a deviation in the standard operating procedure; and
a predictive engine configured by a processor to:
generate predictive results from the at least one pattern, the predictive results comprising at least one control variable to be communicated to at least one of the plurality of devices to control a portion of the well site operations.

9. The system of claim 8, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value.

10. The system of claim 9, where the relay variable comprises an additional variable having a parameter indicating the additional variable as a location variable and a value indicating a location and equipment of the drilling system.

11. The system of claim 8, further comprising at least one gateway configured to communicate the relay variable, the measurement variable, the control variable, or any combination thereof over at least one selected from a group comprising an Internet, an intranet, a data network, a satellite network, and a cellular network to at least one selected from a group comprising a cloud service provider, a load balancing node, and an application processing node.

12. The system of claim 8, further comprises a cloud service provider, the cloud service provider further comprises one or more middleware layer based load balancers, data pre-processing modules, and one or more predictive engines including the predictive engine coupled to the pattern recognition module, the one or more middleware layer based load balancers communicable coupled with the data pre-processing modules and the one or more predictive engines, each data pre-processing module communicable coupled with a corresponding predictive engine in the one or more predictive engines.

13. The system of claim 12, wherein the library module, the analysis module, and the pattern recognition module are parts of each data pre-processing module.

14. The system of claim 12, wherein at least one of the middleware layer based load balancers comprises a Robot Operating System node.

15. A method to control well site operations, comprising:
generating, at a device mounted to equipment of a drilling system, at least one selected from a group comprising a relay variable, a measurement variable, and a control variable;
generating, at the device mounted to equipment of the drilling system, a message having a device address, a network address, or both;
classifying the relay variable, the measurement variable, or the control variable based on a parameter, a value, or both;
identifying a category or a category and sub-category from a plurality of categories and sub-categories based on the parameter, the value, or both;
cataloguing the relay variable, the measurement variable, or the control variable based on the category or the category and the sub-category;

selecting from a library of catalogued relay variables, measurement variables, and control variables, at least one selected from a group comprising a parameter and a value;

identifying at least one pattern using a statistics based algorithm, the statistics based algorithm using a standard operating procedure, at least one semantic category, and the at least one selected from the group comprising the parameter and the value, the at least one pattern indicating a deviation in the standard operating procedure;

generating predictive results from the at least one pattern using a predictive engine, the predictive results comprising at least one control variable; and communicating the at least one control variable to the device mounted to equipment to control a portion of the well site operations.

16. The method of claim 15, wherein the relay variable comprises a parameter indicating the relay variable is a date variable and a value having a time; the measurement variable comprises a parameter indicating that the measurement variable is an equipment variable that identifies equipment, a measurement type, or both, and a value is a measure; and the control variable comprises a parameter indicating the control variable is an equipment variable and a value indicating a control value.

17. The method of claim 16, where the relay variable comprises an additional variable having a parameter indicating the additional variable as a location variable and a value indicating a location and equipment of the drilling system.

18. The method of claim 15, further comprising communicating the relay variable, the measurement variable, the control variable, or any combination thereof over at least one selected from a group comprising an Internet, an intranet, a data network, a satellite network, and a cellular network to at least one selected from a group comprising a cloud service provider, a load balancing node, and an application processing node.

19. The method of claim 15, further comprising load balancing at least one selected from a group comprising a plurality of data pre-processing modules and a plurality of predictive engines.

20. The method of claim 19, wherein the library module, the analysis module, and the pattern recognition module are parts of each data pre-processing module.

\* \* \* \* \*